(12) United States Patent  
Gomi et al.

(10) Patent No.: US 7,219,954 B2
(45) Date of Patent: May 22, 2007

(54) VEHICLE FRONT BODY STRUCTURE (75) Inventors: Tetsuya Gomi, Wako (JP); Yasuhiko Otsuka, Haga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 391 days.

(21) Appl. No.: 10/920,797

(22) Filed: Aug. 18, 2004

(65) Prior Publication Data

US 2005/0046165 A1    Mar. 3, 2005

(30) Foreign Application Priority Data

Aug. 26, 2003 (JP) ............................. 2003-302151

(51) Int. Cl.
*B62D 25/08* (2006.01)

(52) U.S. Cl. ...................... 296/203.02; 296/193.09; 296/198; 296/205; 296/29; 296/187.09

(58) Field of Classification Search ........... 296/203.01, 296/203.02, 205, 29, 30, 187.09, 193.09, 296/198

See application file for complete search history.

(56) References Cited

U.S. PATENT DOCUMENTS

| | | | | |
|---|---|---|---|---|
| 5,372,400 A | * | 12/1994 | Enning et al. | ......... 296/203.03 |
| 6,409,255 B2 | * | 6/2002 | Tilsner et al. | ......... 296/187.09 |
| 6,412,857 B2 | * | 7/2002 | Jaekel et al. | ................. 296/205 |
| 6,540,286 B2 | * | 4/2003 | Takemoto et al. | .......... 296/204 |
| 6,598,933 B2 | * | 7/2003 | Taguchi et al. | ......... 296/203.02 |
| 6,729,424 B2 | * | 5/2004 | Joutaki et al. | ............. 180/68.4 |
| 6,814,400 B2 | * | 11/2004 | Henderson et al. | ..... 296/193.09 |
| 6,860,547 B2 | * | 3/2005 | Winter et al. | .......... 296/193.02 |
| 6,923,495 B2 | * | 8/2005 | Kishikawa et al. | .... 296/193.09 |
| 6,932,405 B2 | * | 8/2005 | Nakagawa et al. | ........... 296/29 |
| 7,066,533 B2 | * | 6/2006 | Sohmshetty et al. | ... 296/203.02 |
| 2002/0008408 A1 | * | 1/2002 | Tilsner et al. | ................ 296/194 |
| 2003/0025358 A1 | * | 2/2003 | Taguchi et al. | ......... 296/203.02 |

FOREIGN PATENT DOCUMENTS

| JP | 63-263175 | 10/1988 |
|---|---|---|
| JP | 2516212 | 4/1996 |
| JP | 10-181630 | 7/1998 |

* cited by examiner

*Primary Examiner*—D. Glenn Dayoan
*Assistant Examiner*—Greg Blankenship
(74) *Attorney, Agent, or Firm*—Rankin, Hill, Porter & Clark LLP (57) ABSTRACT

Front upper members and front side members located laterally inward of the front upper members are joined with connecting members of pipe form. A first end portion of each connecting member extends through the front side member and is welded to both sides of the side member. The joint has high rigidity. When impact energy acts on either front upper member, the energy is transmitted to the front side member via the connecting member, and the front side member and the front upper member plastically deform.

5 Claims, 11 Drawing Sheets

VEHICLE FRONT BODY STRUCTURE

FIELD OF THE INVENTION

The present invention relates to an improvement in a vehicle front body structure. A "front body part" herein means a portion forward of front pillars and a dashboard.

BACKGROUND OF THE INVENTION

A vehicle front body structure designed to allow a front body part to absorb collision energy in a vehicle frontal crash is disclosed, for example, in Japanese Patent No. 2516212. The vehicle front body structure will be described with reference to FIGS. 12 and 13.

Figure 12:
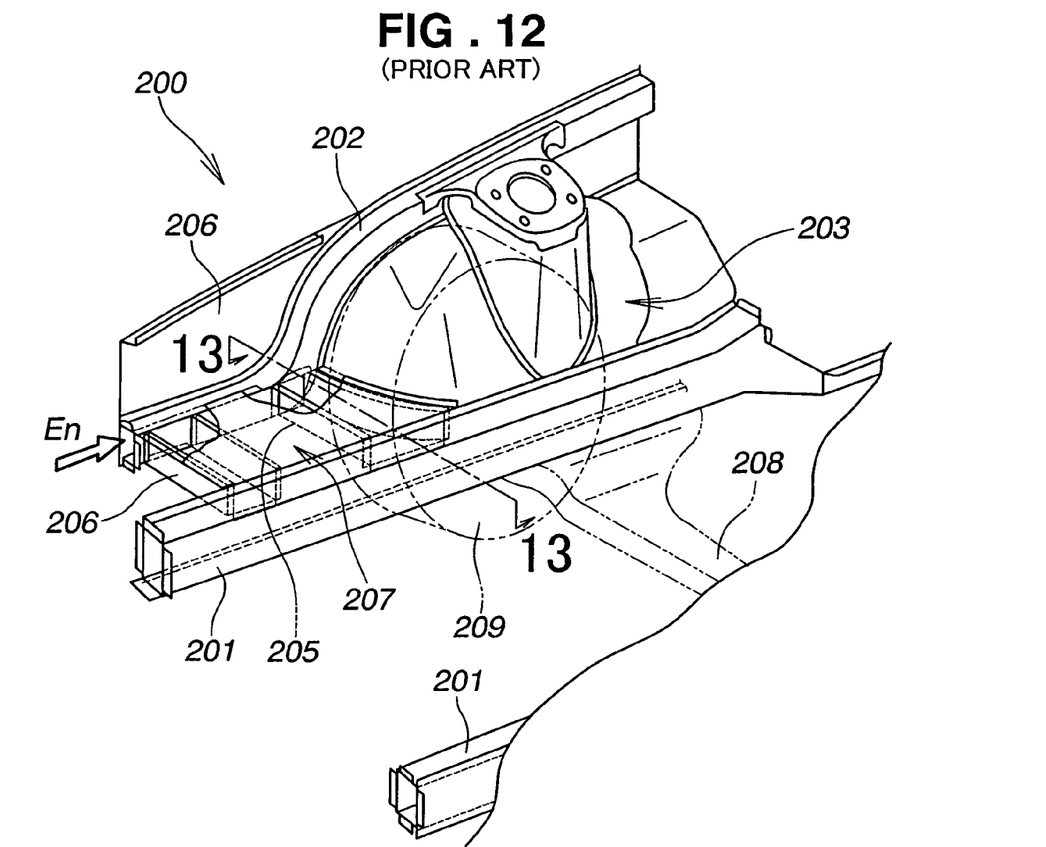
FIG. 12 is a perspective view showing a portion of a conventional vehicle front body structure.
Figure 13:
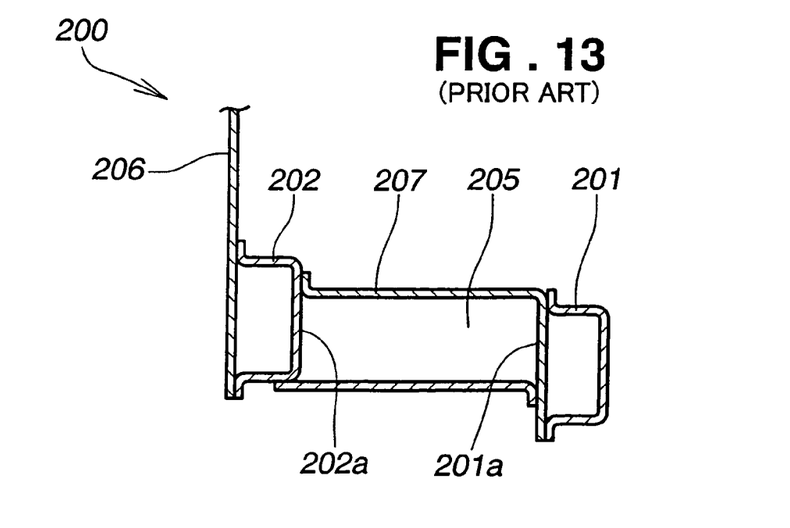
FIG. 13 is a cross-sectional view along line 13-13 of FIG. 12.

A conventional vehicle body 200 has a pair of right and left front side members 201, 201 extending longitudinally of the body on the right and left sides of its front part. Right and left front upper members 202, 202 (only the right one shown) extend longitudinally of the body, laterally outside of and above the front side members 201, 201. Right and left wheel houses 203, 203 are provided between the right and left front side members 201, 201 and the right and left front upper members 202, 202, respectively.

In front of the right wheel house 203, the right front side member 201 and the right front upper member 202 are connected at their front portions with front and rear connecting members 204, 205. The left side of the vehicle body 200 has the same configuration.

Reference numeral 206 denotes a front fender. A panel 207 is extended over the front and rear connecting members 204, 205. A subframe member 208 is extended between the right and left front side members 201, 201. Reference numeral 209 denotes a front wheel.

When an impact energy En acts from the vehicle front at a position laterally outside of either front side member 201 in the front part of the body 200, or at what is called an offset collision at the front of the body 200, the impact energy En acts on the front upper member 202, and also acts on the front side member 201 through the connecting members 204, 205. The front side member 201 and the front upper member 202 plastically deform, thereby mitigating the impact energy En acting toward the passenger compartment. That is, the impact energy En acting on the front upper member 202 is absorbed not only by the front upper member 202 but also by the front side member 201 to some extent.

In order to efficiently absorb such an impact energy En by the front part of the body 200, it is conceivable to allow more impact energy En to be transmitted to the front side member 201. For this, it is required to increase the rigidity of the connecting members 204, 205 and the rigidity of joined portions of the connecting members 204, 205.

In the conventional structure, the connecting members 204, 205 are butt-joined at their respective opposite ends to a laterally outer surface 201a of the front side member 201 and a laterally inner surface 202a of the front upper member 202. With this structure, it is relatively easy to increase the rigidity of the connecting members 204, 205. However, with this structure as it is, there is a limit to increase the rigidity of the joined portions.

It is thus desired to be able to efficiently absorb an impact energy at an offset impact on the front of a vehicle body, by a front body part with a simple configuration.

SUMMARY OF THE INVENTION

According to the present invention, there is provided a vehicle front body structure which comprises: right and left front side members extending longitudinally of a vehicle body on the right and left sides of a front body part; right and left front upper members provided laterally outside and above the front side members and extending longitudinally of the vehicle body; right and left wheel houses disposed between the right and left front side members and the right and left front upper members, respectively; and right and left connecting members disposed in such a manner as to extend transversely in front of the right and left wheel houses, the right connecting member having a first end portion and a second end portion, the first end portion extending transversely through the right front side member and being weld connected both sides of the right front side member, the second end portion being joined to the right front upper member, the left connecting member having a first end portion and a second end portion, the first end portion of the left connecting member extending transversely through the left front side member and being weld connected to both sides of the left front side member, the second end portion of the left connecting member being joined to the left front upper member.

Thus, in this invention, since the first end portions of the right and left connecting members are transversely extended through the front side members in front of the right and left wheel houses, respectively, each of which being welded to the both sides of the front side member it extends through, the rigidity of joints at which the first end portions of the connecting members are joined to the front side members (that is, base portions of the connecting members) is sufficiently increased by the simple configuration.

As a result, when impact energy acts on either front upper member from the front of the body, the impact energy is transmitted from the front upper member to the front side member via the connecting member and the joint (the base portion of the connecting member) of high rigidity. The front side member and the front upper member then plastically deform, thereby sufficiently mitigating the impact energy acting toward the passenger compartment. That is, the impact energy acting on the front upper member is absorbed not only by the front upper member but also by the front side member sufficiently.

As described above, in this invention, the simple configuration allows impact energy at an offset impact on the front of the body to be dispersed into the front side member and the front upper member, so that the impact energy is efficiently absorbed by the front body part. As a result, the impact energy acting toward the passenger compartment is further mitigated.

Since front portions of the front side members and front portions of the front upper members are connected by the connecting members, the rigidity of the front body part is increased, and the rigidity of the body as a whole including a passenger compartment part is increased.

Further, since the first end portion of each connecting member is attached to the front side member in a transversely penetrating manner, the mounting position of the connecting member relative to the front side member is more easily improved in accuracy.

Preferably, the right and left front side members each comprises a hollow member having an inner side member half toward a vehicle width center line and an outer side member half laterally outside, the inner and outer side member halves having a through-hole formed to allow the first end portion of the connecting member to extend therethrough, and the first end portions of the right and left connecting members are each joined to a joining flange placed against and joined to the outer side member half from laterally outside. Thus, the welding operation for the joints between the connecting members and the front side members can be performed in stages at different times to prevent welding heat distortion.

BRIEF DESCRIPTION OF THE DRAWINGS

Preferred embodiments of the present invention will be described in detail below, by way of example only, with reference to the accompanying drawings, in which.

DETAILED DESCRIPTION OF THE PREFERRED EMBODIMENTS

Figure 1:
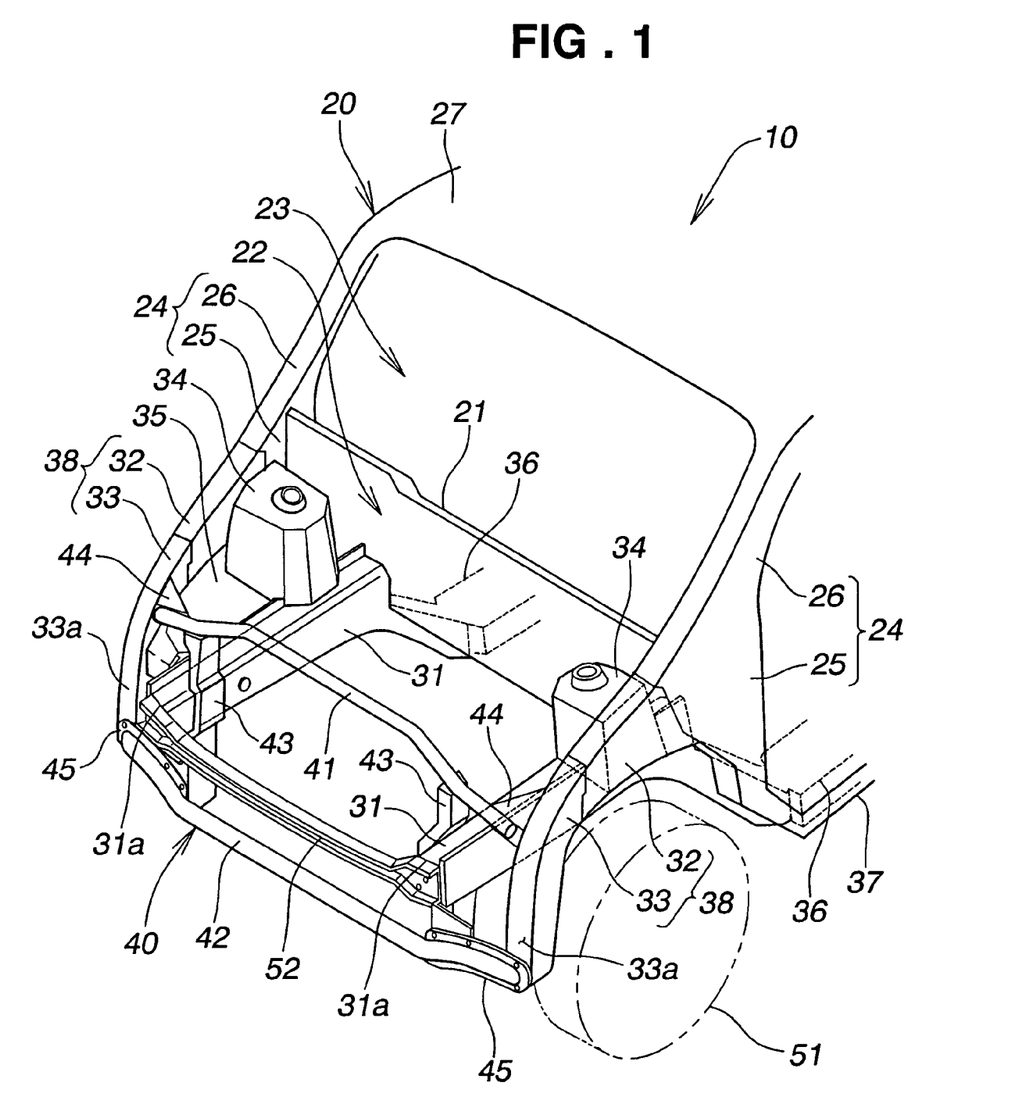
FIG. 1 is a perspective view of a vehicle front body part according to the present invention.

A vehicle 10 shown in FIG. 1 has a body 20 (i.e., a body frame 20) partitioned into a front engine compartment 22 and a rear passenger compartment 23 by a dashboard 21, and has right and left front pillars 24, 24 put upright near the dashboard 21.

A front structure of the body 20 having a monocoque structure will be described below. A "front part of the body 20" herein means a portion forward of the dashboard 21 and the front pillars 24, 24 in the body 20. The dashboard 21 is a partition board and is also called a dash panel. The front pillars 24, 24 are column supports disposed between a windshield and side glasses.

The front part of the body 20 has the structure in which a pair of right and left front side members 31, 31 are extended longitudinally on the right and left sides of the front body part; right and left upper members 32, 32 are extended forward from the right and left front pillars 24, 24, laterally outside of and above the front side members 31, 31; right and left drooped portions 33, 33 are extended from the front ends of the upper members 32, 32 below the right and left front side members 31, 31; a front bulkhead 40 is joined to front portions of the right and left front side members 31, 31 and front portions of the right and left drooped portions 33, 33; and right and left front damper housings 34, 34 and right and left wheel houses 35, 35 are individually extended between the front side members 31, 31 and the upper members 32, 32.

Each upper member 32 and the corresponding drooped portion 33 are combined into one piece, constituting a front upper member 38.

As is clear from the above description, the body 20 has the right and left front upper members 38, 38 extended longitudinally, laterally outside of and above the right and left front side members 31, 31, and the right and left front damper housings 34, 34 and the right and left wheel houses 35, 35 individually extended between the right and left front side members 31, 31 and the right and left front upper members 38, 38.

Right and left front wheels 51 (Only the left one shown in the figure.) are disposed laterally outside of the front side members 31, 31.

The rear ends of the front side members 31, 31 are connected to right and left center side members 36, 36. Each front damper housing 34 supports an upper portion of a front suspension (not shown) for the front wheel 51. Each wheel house 35 is a cover bulging toward the vehicle center line, covering an upper portion of the front wheel 51, and is joined to the front damper housing 34.

The front bulkhead 40 includes a front upper crossmember 41 extended between upper portions of the right and left drooped portions 33, 33, a front lower crossmember 42 extended between lower portions of the right and left drooped portions 33, 33, and right and left side stays 43, 43 extended between the front upper and lower crossmembers 41, 42.

The front upper crossmember 41 is located above the right and left front side members 31, 31, supporting a radiator (not shown). The front lower crossmember 42 is located below the right and left front side members 31, 31, bearing the radiator (not shown). The upright right and left side stays 43, 43 can also be joined to the right and left front side members 31, 31, increasing the rigidity of the body 20.

The body 20 also has a front bumper beam 52 extended between front ends 31a, 31a of the right and left front side members 31, 31. In the figure, reference numeral 27 denotes a roof, and 37 a side sill.

Figure 2:
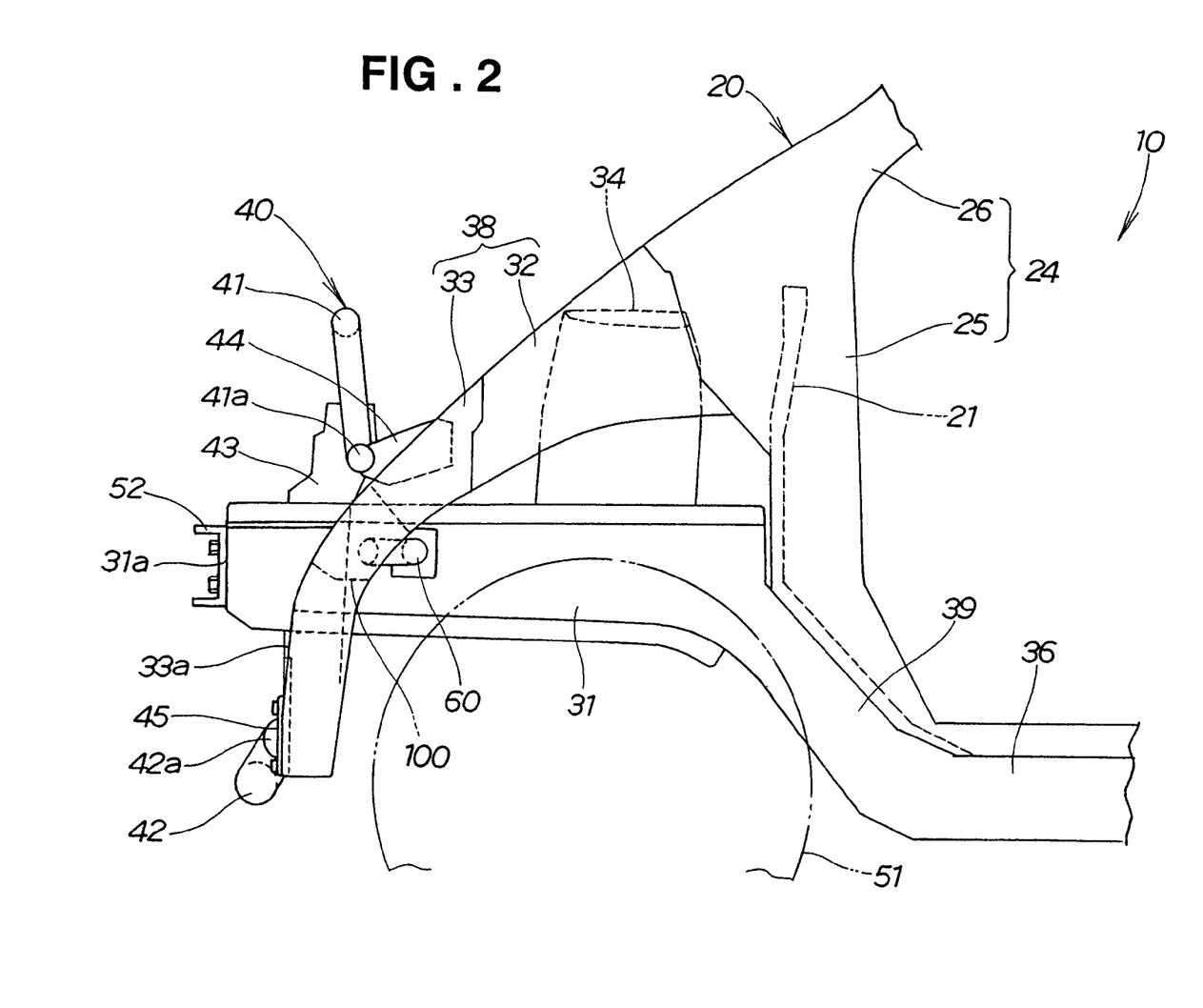
FIG. 2 is a side view of the vehicle front body part shown in FIG. 1.

FIG. 2 shows the front body part when viewed from the side. The center side member 36 has an extension 39 extending forward and upward from its front end. To the front end of the extension 39, the rear end of the front side member 31 is joined. The front pillar 24 includes a lower pillar portion 25 as the lower half and an upper pillar portion 26 as the upper half.

The upper member 32 is located above the front wheel 51, extending from the upper end of the lower pillar portion 25, with a forward and downward inclination. The drooped portion 33 extends from the front end of the upper member 32 in a downward curve, drooping in front of the front wheel 51, and further extends downward nearly vertically.

Figure 3:
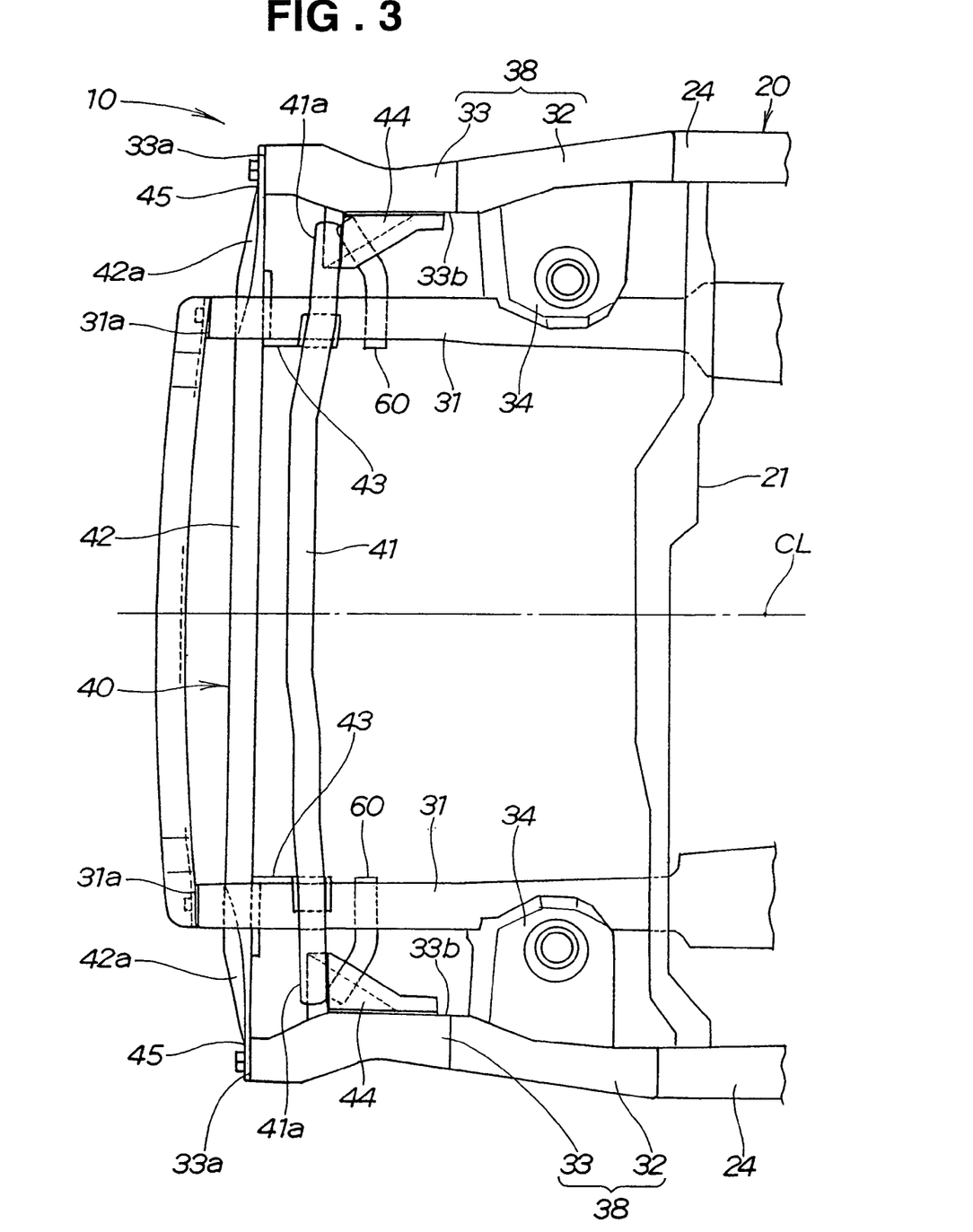
FIG. 3 is a plan view of the vehicle front body part shown in FIG. 1.

As shown in FIG. 3, the front lower crossmember 42 is arranged rearward of the front ends 31a, 31a of the right and left front side members 31, 31. The front upper crossmember 41 is arranged rearward of the front lower crossmember 42.

The front upper crossmember 41 and the front lower crossmember 42 are transversely elongated round pipes of substantially linear shapes in a plan view.

Longitudinal ends 41a, 41a of the front upper crossmember 41 are joined by welding or the like to inside surfaces 33b, 33b of the right and left drooped portions 33, 33 via right and left joining members 44, 44. The joining members 44, 44 are gusset plates of a substantially triangular shape in a plan view.

Figure 4:
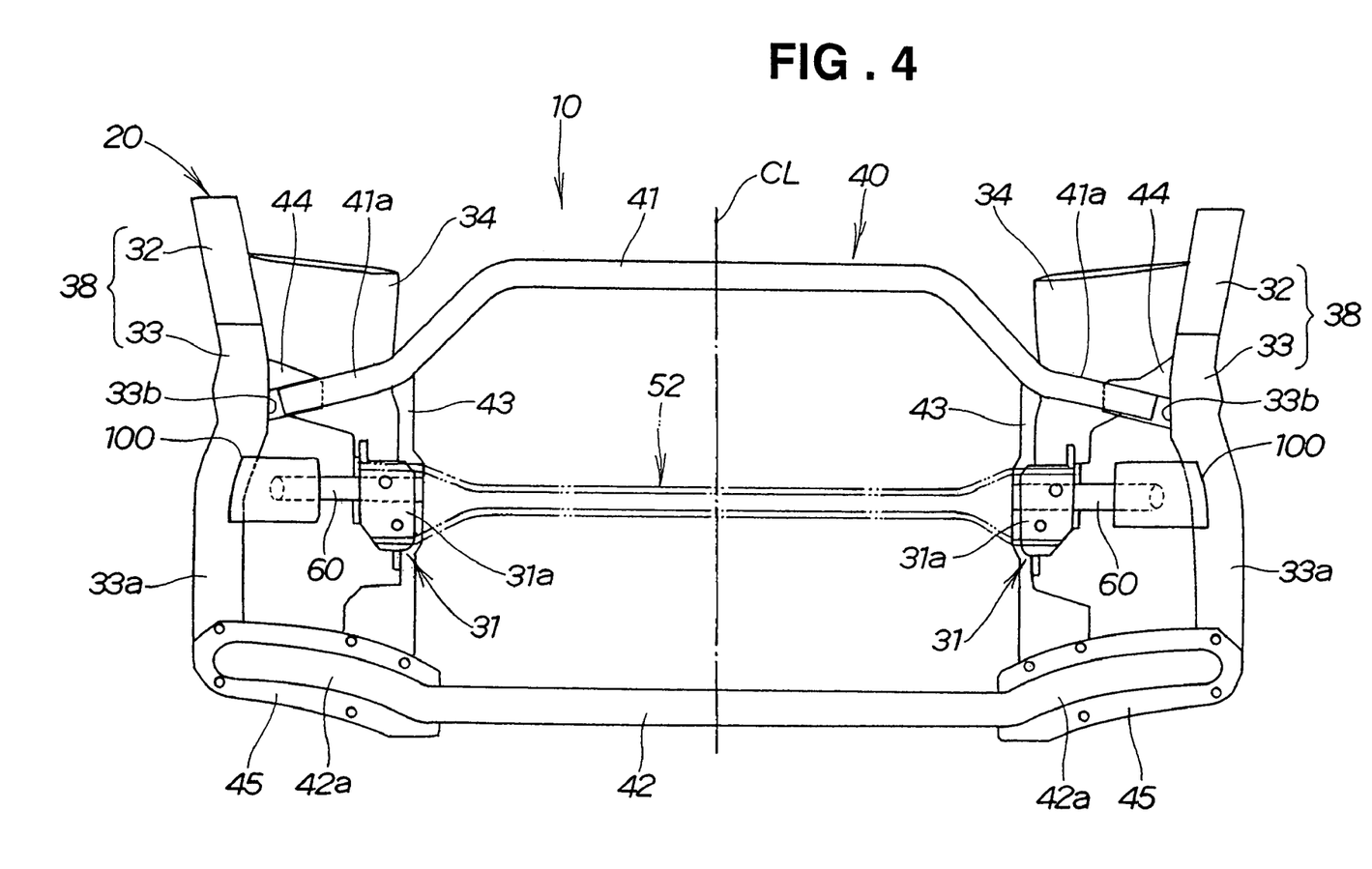
FIG. 4 is a front view of the vehicle front body part shown in FIG. 1.

FIG. 4 shows the front of the front body part. The front upper crossmember 41 has a hat-like shape in a front view. The front lower crossmember 42 has a substantially linear shape also in a front view. Longitudinal ends 42a, 42a of the front lower crossmember 42 are joined by bolting, welding or the like to front ends 33a, 33a of the right and left drooped portions 33, 33 via vertical plate-shaped joining members 45, 45 (see FIG. 2).

Here, also referring to FIGS. 1 to 3, description will be made. Right and left connecting members 60, 60 connecting the front side members 31, 31 and the drooped portions 33, 33 of the front upper members 38, 38 are arranged forward of the right and left wheel houses 35, 35 and rearward of the front upper crossmember 41, extending nearly horizontally from the right and left front side members 31, 31 laterally outward. The connecting members 60, 60 are circular-section round pipes.

The connecting structures of the connecting members 60, 60 will be described in detail below with reference to FIGS. 5 to 7 and FIGS. 8A to 8C. The right and left connecting members 60, 60 and the connecting structures are symmetrical with respect to the vehicle width center line CL, and therefore only the left side structure will be shown and the right side structure will not be described.

Figure 5:
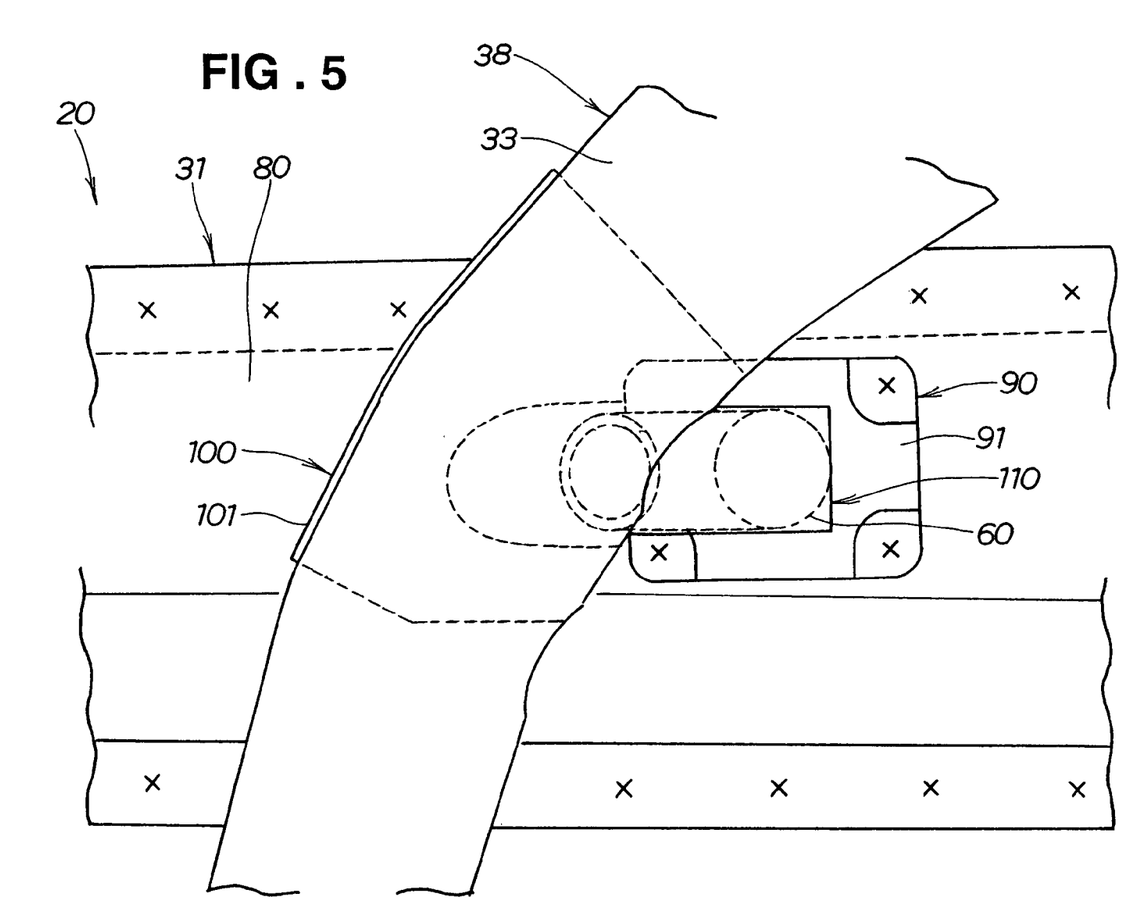
FIG. 5 is a side view illustrating the relationship between a left front side member, a left front upper member and a connecting member.
Figure 6:
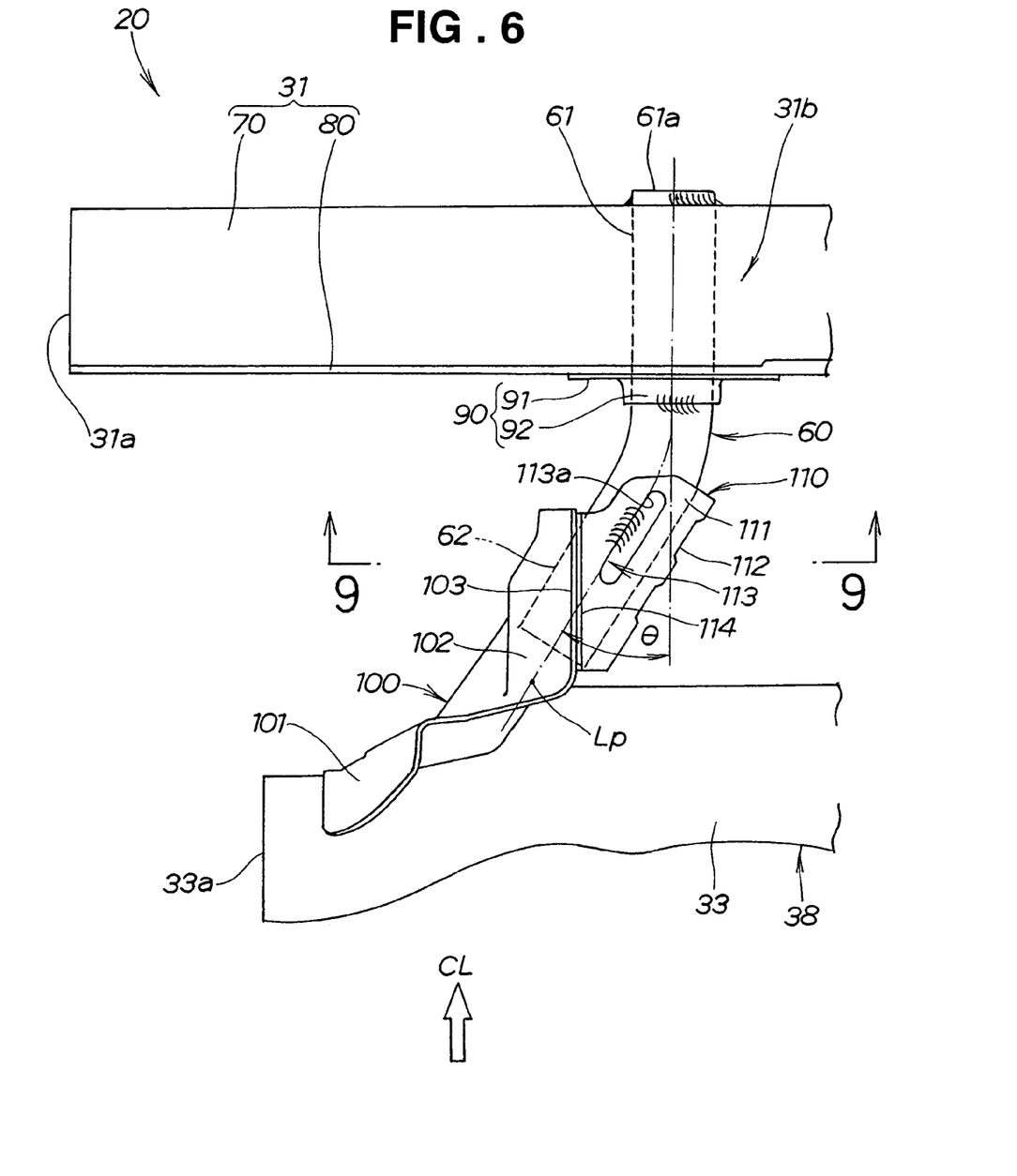
FIG. 6 is a plan view illustrating a connecting structure shown in FIG. 5.
Figure 7:
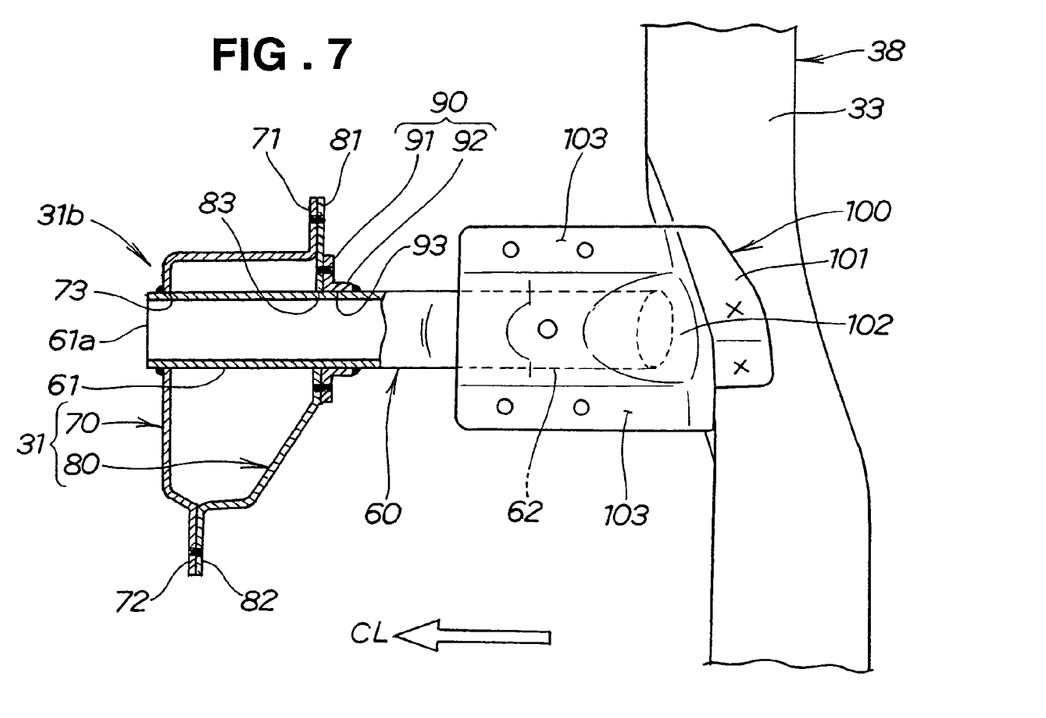
FIG. 7 is a front view of the connecting structure, showing, in cross section, the left front side member and a first end portion of the connecting member in FIG. 5.

As shown in FIGS. 5 to 7, the left connecting member 60 is a round pipe bent in its longitudinal direction. Here, the "round pipe" indicates a generally circular cross section, and may have a perfectly circular cross section or an elliptical cross section. Specifically, as shown in FIG. 6, the connecting member 60, when viewed from the top, has a first end portion 61 extending linearly in a transverse direction and a second end portion 62 bent forward in a curve at angle θ with respect to the first end portion 61.

In the connecting structure of the left connecting member 60, (1) the first end portion 61 of the connecting member 60 transversely extends through the left front side member 31, and is welded to both sides of the front side member 31 through which it extends, that is, to an inner side member half 70 and an outer side member half 80, and (2) the second end portion 62 of the connecting member 60 is joined to the left front upper member 38.

As shown in FIG. 7, the front side member 31 is a hollow member consisting of the inner side member half 70 toward the vehicle width center line CL and the outer side member half 80 laterally outside.

The inner side member half 70 is a sheet-steel press-molded part of a substantially inverted L shape in a front view, a member integrally formed with an upper flange 71 extending upward from its top edge and a lower flange 72 extending downward from its lower edge. The outer side member half 80 is a sheet-steel press-molded part of a substantially L shape in a front view, a member integrally formed with an upper flange 81 extending upward from its upper edge and a lower flange 82 extending downward from its lower edge.

The outer side member half 80 is put on the inner side member half 70 to be joined by spot welding the upper flanges 71, 81 and the lower flanges 72, 82, thereby to form the front side member 31 of a closed section structure of a substantially rectangular shape in a front view.

The inner and outer side member halves 70, 80 have through holes 73, 83 concentric with one another, through which the first end portion 61 of the connecting member 61 extends.

The left connecting member 60 has a joining flange 90 joined onto the first end portion 61, to be put against and joined to the outer side member half 80 from laterally outside (right side in FIG. 7).

The joining flange 90 is a joining member called a neck flange, having a rectangular or circular flange 91 integrally formed with a tubular neck 92. The thickness of the flange 91 is set greater than that of the inner and outer side member halves 70, 80, increasing the rigidity. The neck 92 has an insertion hole 93 through which the first end portion 61 of the connecting member 60 extends.

The first end portion 61 extending through the joining flange 90 is welded to the neck 92. The first end portion 61 is inserted through the through holes 73, 83. The flange 91 is welded to the outer side member half 80, and the end of the first end portion 61 is welded to the inner side member half 70. Thus, the first end portion 61 of the connecting member 60 is joined to the front side member 31. The welding is MIG welding, for example, for increasing the reliability of the joints.

Since the first end portion 61 of the connecting member 60 is attached to the front side member 31 in a transversely penetrating manner, the mounting position of the connecting member 60 relative to the front side member 31 is easily improved in accuracy.

Now, the process of joining the first end portion 61 of the connecting member 60 to the front side member 31 will be described with reference to FIGS. 8A to 8C.

Figure 8A:
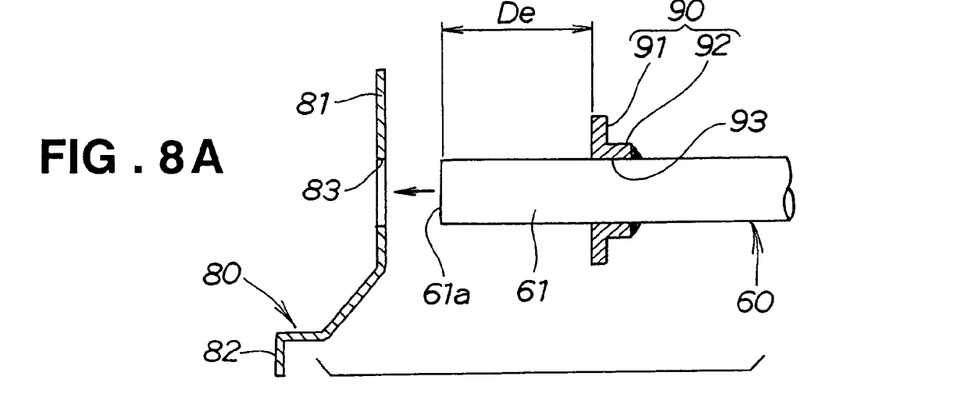
FIGS. 8A to 8C are diagrams illustrating the process of joining a first end portion of a connecting member to a front side member.

First, as shown in FIG. 8A, the first end portion 61 of the connecting member 60 is inserted into the joining flange 90, and the joining flange 90 is set at a predetermined position of depth dimension De from an end 61a of the first end portion 61. An outer peripheral surface of the first end portion 61 of the connecting member 60 is intermittently or continuously welded to an end of the neck 92 of the joining flange 90. Intermittent welding is preferable for preventing welding heat distortion.

Figure 8B:
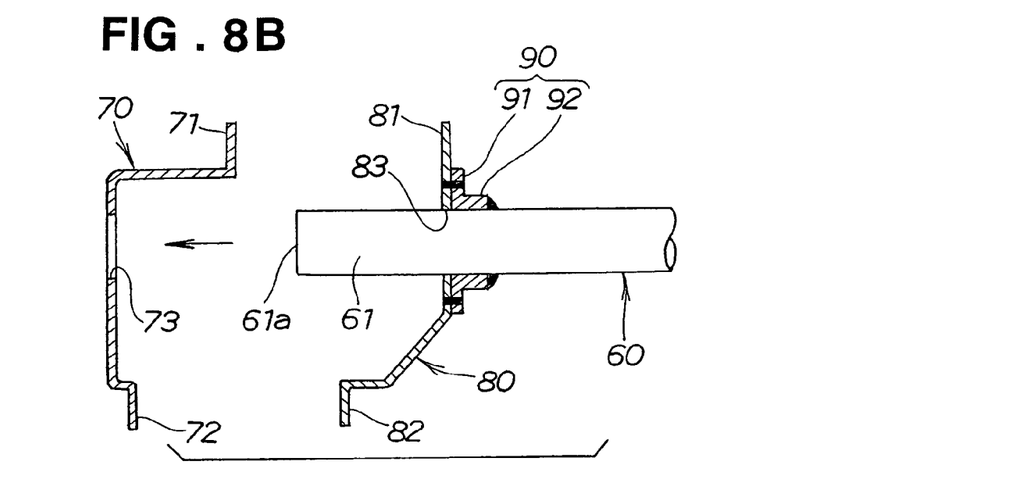

Then, as shown in FIG. 8B, the first end portion 61 is inserted into the through hole 83 of the outer side member half 80 from laterally outside (right side in the figure), putting the flange 91 onto the outer side member half 80 from laterally outside. Then, the flange 91 is spot-welded to the outer side member half 80.

Figure 8C:
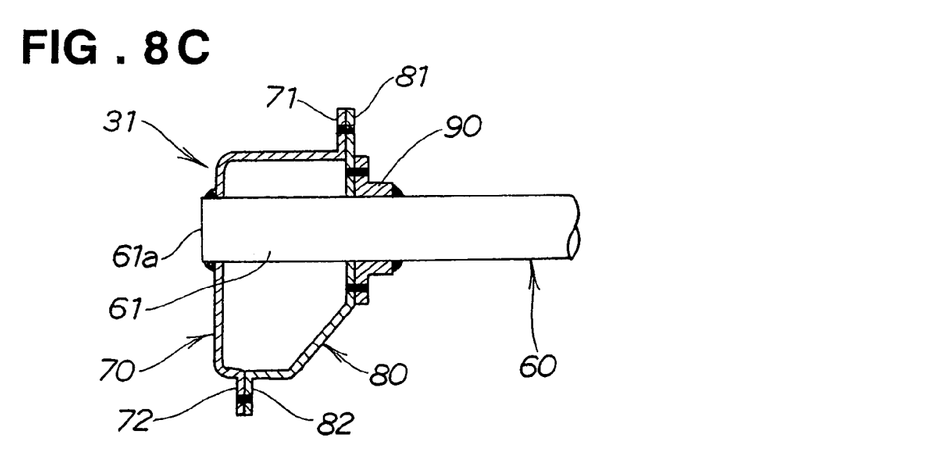

As shown in FIG. 8C, after inserting the first end portion 61 into the through hole 73 of the inner side member half 70, the inner side member half 70 and the outer side member half 80 are put together. Then, the upper flanges 71, 81 and the lower flanges 72, 82 are spot-welded.

Finally, an outer peripheral surface of the end 61a of the first end portion 61 is intermittently or continuously welded to the inner side member half 70, completing the operation of joining the first end portion 61 of the connecting member 60 to the front side member 31. Intermittent welding is preferable for preventing welding heat distortion.

The operation of welding the upper flanges 71, 81 and the lower flanges 72, 82 and the operation of welding the first end portion 61 to the inner side member half 70 may be reversed in order.

The welding operation for the joints between the connecting member 60 and the front side member 31 may be performed in stages at different times to prevent welding heat distortion in the front side member 31 and the connecting member 60.

Now, the connecting structure of the second end portion 62 of the connecting member 60 will be described with reference to FIGS. 5 to 7 and FIGS. 9 to 10.

As shown in FIGS. 6, 7, 9 and 10, the second end portion 62 of the connecting member 60 is connected to the front upper member 38 via a bracket 100 and a stay 110.

Figure 9:
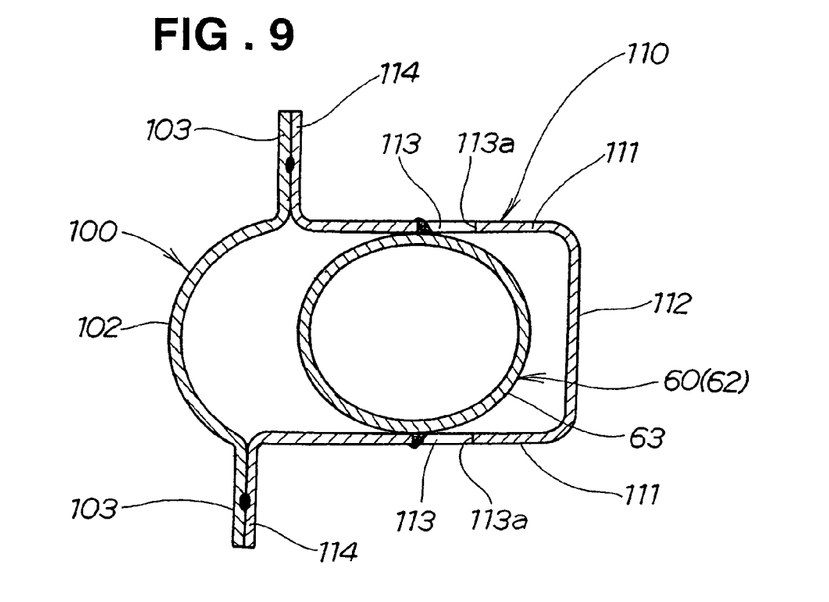
FIG. 9 is a cross-sectional view along line 9-9 of FIG. 6.

The bracket 100 is, as shown in FIGS. 6, 7 and 9, a sheet-steel press-molded part extending horizontally from the drooped portion 33 of the front upper member 38 toward the front side member 31. Specifically, the bracket 100 consists of a base portion 101 welded to the drooped portion 33, a support portion 102 extending from the base portion 101 toward the front side member 31, and flanges 103, 103 extending upward and downward from the upper and lower edges of the support portion 102.

The support portion 102 has a substantially U shape, as viewed in cross-section, bent toward the opposite side of the second end portion 62 of the connecting member 60 so as not to interfere with the second end portion 62 (see FIG. 9). The upper and lower flanges 103, 103 are in parallel with the first end portion 61 of the connecting member 60.

Figure 10:
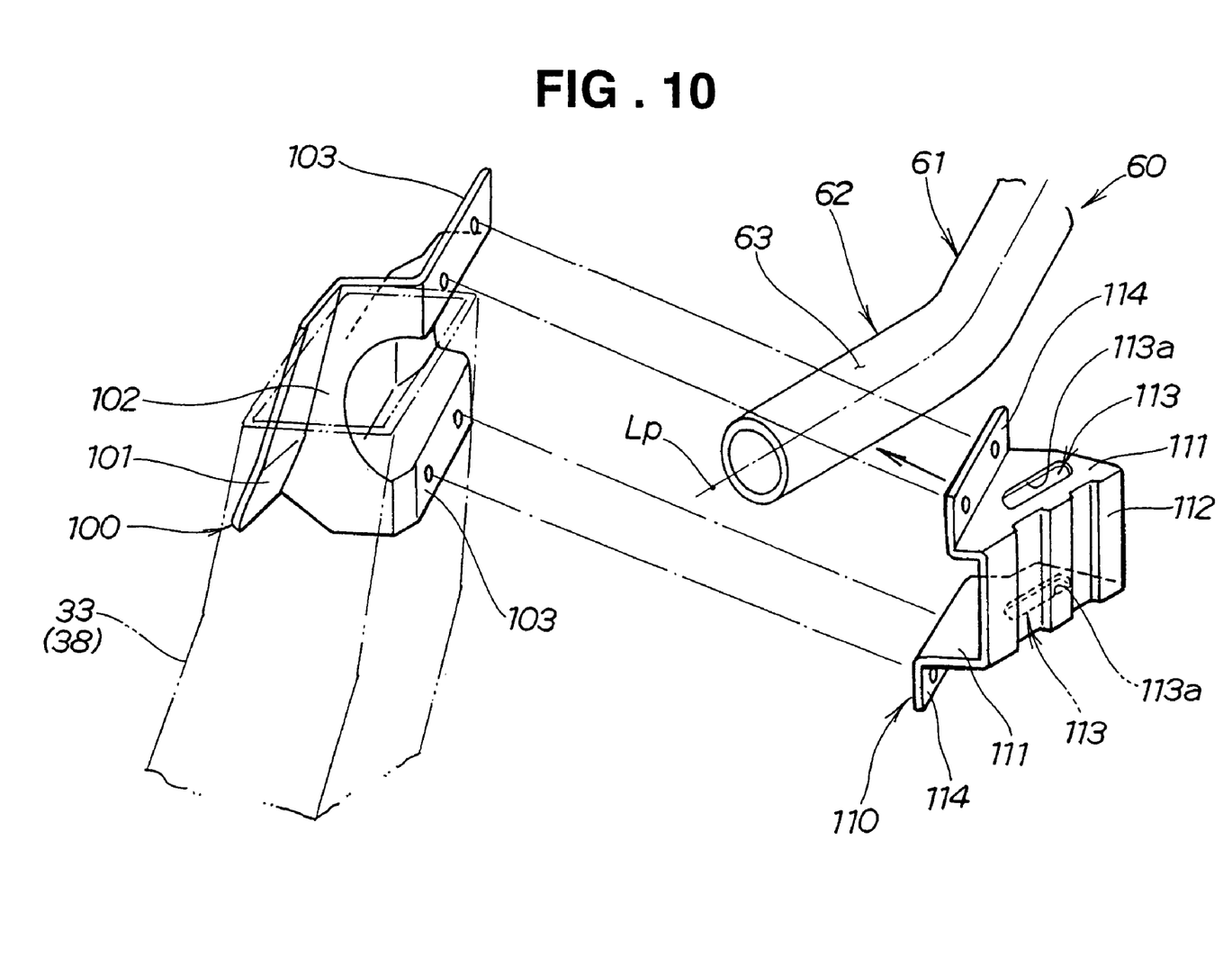
FIG. 10 is an exploded perspective view of a bracket, a stay and a second end portion of the connecting member shown in FIG. 9.

The stay 110 is a pipe-like member for attaching the connecting member 60 of a bent round pipe to the bracket 100. Hereinafter, the connecting member 60 is referred to as a "round pipe 60" when appropriate, and the stay 110 is referred to as a "pipe stay 110" when appropriate.

The stay 110 is a pipe stay consisting of a pair of upper and lower flat-plate flanges 111, 111 for sandwiching the round pipe 60 slidably along its outer surface 63, and a connecting portion 112 connecting the flanges 111, 111, and is a sheet-steel press-molded part having a substantially U-shaped cross section opening toward the opening side of the support portion 102 of the bracket 100.

The pair of upper and lower flanges 111, 111 have plate surfaces opposite to one another in parallel. The stay 110 is positioned relative to the round pipe 60 in a pipe radial direction. For welding the flanges 111, 111 to the outer surface 63 of the round pipe 60, the flanges 111, 111 are formed with elongate holes 113, 113, respectively. The elongate holes 113, 113 are formed subparallel with the axially longitudinal center line Lp (see FIG. 10) of the round pipe 60.

As shown in FIGS. 6 and 9, after slidingly positioning the pipe stay 110 relative to the round pipe 60, edges 113a, 113a forming the elongate holes 113, 113 are welded to the outer surface 63 of the round pipe 60, whereby the stay 110 is joined to the round pipe 60. In joining the round pipe 60 and the stay 110, the elongate holes 113, 113 allow the weld length to be set freely, providing necessary joint rigidity.

The pair of upper and lower flanges 111, 111 have integrally formed joining flanges 114, 114, respectively, to be put onto and joined to the respective flanges 103, 103 of the bracket 100. As shown in FIG. 9, the flanges 103, 103 of the bracket 100 and the joining flanges 114, 114 of the stay 110 are joined by spot welding. As a result, the bent round pipe 60 is easily joined to the front upper member 38 via the stay 110.

Now, the functions of the vehicle front body structure of the above configuration will be described with reference to FIG. 11.

Figure 11:
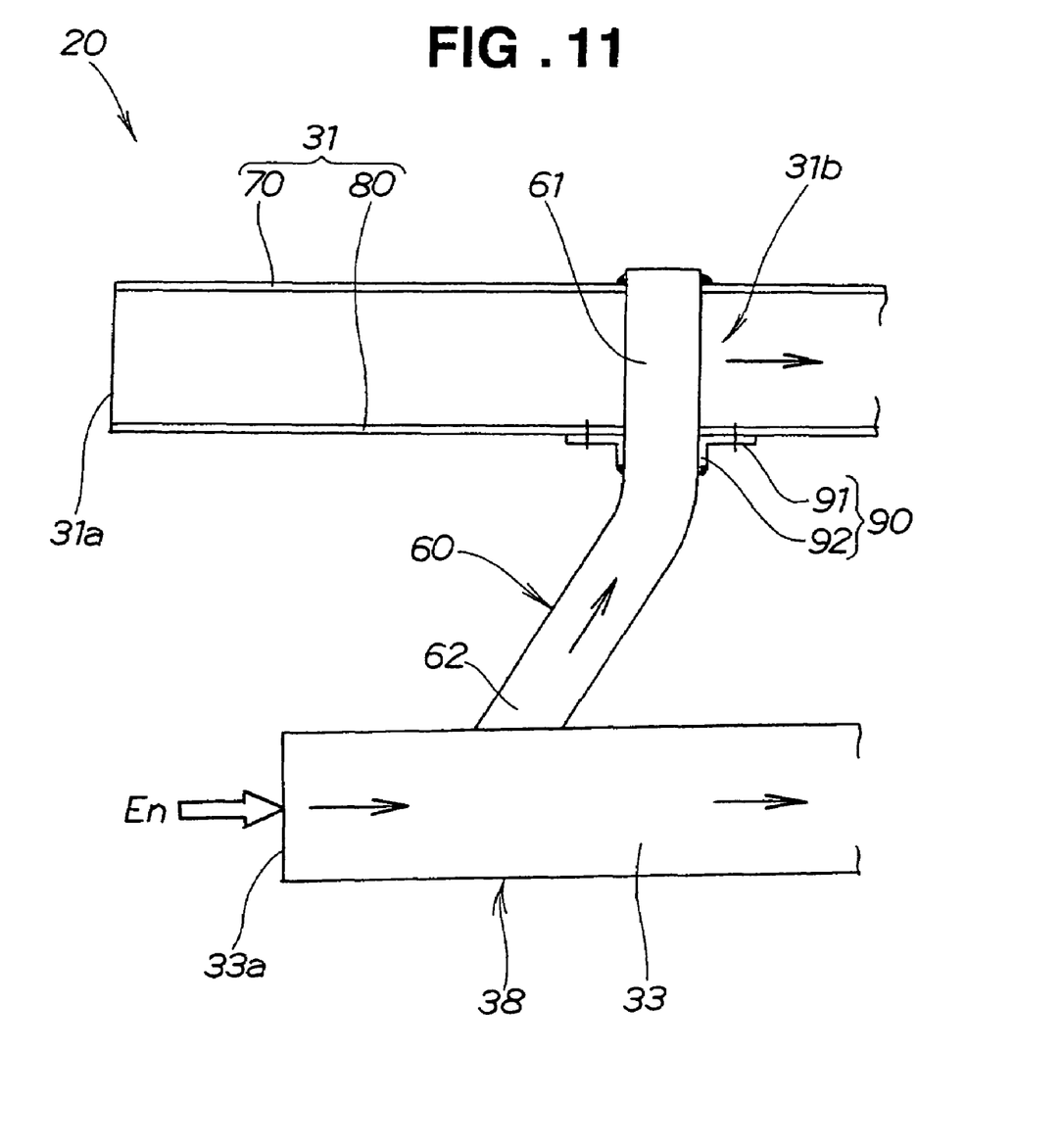
FIG. 11 is a diagram illustrating the state in which impact energy occurs at a front upper member and the impact energy is transmitted to a front side member via a connecting member.

FIG. 11 schematically shows the relationship between the front side member 31, the front upper member 38 and the connecting member 60 on the left side.

The first end portion 61 of the connecting member 60 transversely extends through the front side member 31 in front of the wheel house 35 (see FIG. 1). The first end portion 61 is welded to the both sides it extends through, that is, the inner and outer side member halves 70, 80 of the front side member 31. Thus, the simple configuration sufficiently increases the rigidity of a joined portion 31b of the front side member 31 to which the first end portion 61 of the connecting member 60 is joined. Details will be described below.

Suppose here that the connecting member 60 is a cantilever with the first end portion 61 fixed. The joined portion 31b to which the first end portion 61 is joined is a base portion of the cantilever. When the second end portion 62 is under a bending load, the joined portion 31b (base portion 31b) is subjected to the maximum bending moment.

However, since the first end portion 61 of the connecting member 60 is joined both to the inner side member half 70 and to the outer side member half 80, the base portion 31b has very large rigidity. The maximum bending moment on the base portion 31b is thus received by the front side member 31 as a whole having a closed cross-section structure.

Since the first end portion 61 is joined to the outer side member half 80 via the necked flange 90 of high rigidity, the load is dispersed into the outer side member half 80. This prevents stress concentration at the outer side member half 80, ensuring sufficient rigidity of the front side member 31 as a whole.

When an impact energy En acts on the front upper member 38 from the front of the body 20, the impact energy En is sufficiently transmitted from the front upper member 38 to the front side member 31 via the connecting member 60 and the base portion 31b of high rigidity. The front side member 31 and the front upper member 38 then plastically deform, thereby sufficiently mitigating the impact energy En acting toward the passenger compartment 23 (see FIG. 1). That is, the impact energy En acting on the front upper member 38 is absorbed not only by the front upper member 38 but also by the front side member 31 sufficiently.

With this simple structure, an impact energy En at an offset impact on the front of the body 20 is sufficiently dispersed into the front side member 31 and the front upper member 38, thus being efficiently absorbed. Then, the impact energy En acting toward the passenger compartment 23 (see FIG. 1) is mitigated.

The connecting member 60 connects a front portion of the front side member 31 and a front portion of the front upper member 38, thus increasing the rigidity of the body 20 front part. As a result, the rigidity of the body 20 as a whole including a passenger compartment 23 part is increased.

The right connecting member 60 and its connecting structure are identical to the left connecting member 60 and its connecting structure, and have the same functions and effects. Specifically, the right connecting member 60 has a first end portion 61 transversely extending through the right front side member 31, welded to both sides it extends through, that is, inner and outer side member halves 70, 80, and has a second end portion 62 joined to the right front upper member 38.

Each connecting member 60 shown in this embodiment is a bent round pipe, but the present invention is not limited thereto. It may be a hollow or solid linear member of a round cross section or a square cross section.

As described above, the vehicle front body structure of the present invention is useful especially for automobiles having right and left front side members 31, 31 and right and left front upper members 38, 38.

Obviously, various minor changes and modifications of the present invention are possible in the light of the above teaching. It is therefore to be understood that within the scope of the appended claims the invention may be practiced otherwise than as specifically described.

What is claimed is:

1. A vehicle front body structure comprising:
   right and left front side members extending longitudinally of a vehicle body on the right and left sides of a front body part;
   right and left front upper members provided laterally outside the front side members and extending longitudinally of the vehicle body;
   right and left wheel houses disposed between the right and left front side members and the right and left front upper members, respectively; and
   right and left connecting members, each comprising a bent pipe, disposed in such a manner as to extend transversely in front of the right and left wheel houses, respectively, the right connecting member having a first end portion and a second end portion, the right connecting member first end portion extending transversely through the right front side member and being weld connected to both sides of the right front side member, the right connecting member second end portion being joined to a right stay that is joined to a right bracket that is joined to the right front upper member, the left connecting member having a first end portion and a second end portion, the left connecting member first end portion extending transversely through the left front side member and being weld connected to both sides of the left front side member, the left connecting member second end portion being joined to a left stay that is joined to a left bracket that is joined to the left front upper member.

2. A front body part structure as set forth in claim 1, wherein the right and left front side members each comprises a hollow member having an inner side member half toward a vehicle width center line and an outer side member half laterally outside, the inner and outer side member halves having a through-hole formed to allow the first end portion of the connecting member to extend therethrough, and the first end portions of the right and left connecting members are each joined to a joining flange fitted against and joined to the outer side member half from laterally outside.

3. The vehicle front body part structure as set forth in claim 1, wherein the right and left front upper members comprise right and left upper members disposed above the right and left front side members, and right and left drooped portions that extend from front ends of the right and left upper members, respectively.

4. The vehicle front body part structure as set forth in claim 3, wherein the right bracket is joined to the right drooped portion and the left bracket is joined to the left drooped portion.

5. The vehicle front body part structure as set forth in claim 4, wherein the right connecting member first end portion and the left connecting member first end portion extend linearly in a transverse direction and the right connecting member second end portion and left connecting member second end portion is bent forward in a curve at an angle θ with respect to the right connecting member first end portion and the left connecting member second end portion, respectively.

* * * * *